(12) United States Patent
Li et al.

(10) Patent No.: US 8,731,624 B2
(45) Date of Patent: May 20, 2014

(54) ELECTRONIC DEVICE FOR ACCESSING WIRELESS NETWORK AND METHOD FOR SAVING RESOURCES FOR THE DEVICE

(75) Inventors: Dong-Sheng Li, Shenzhen (CN); Han-Che Wang, Tu-Cheng (TW); Hsin-Nan Hu, Tu-Cheng (TW); Jun-Xin Chai, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 422 days.

(21) Appl. No.: 13/084,540

(22) Filed: Apr. 11, 2011

(65) Prior Publication Data
US 2012/0083223 A1 Apr. 5, 2012

(30) Foreign Application Priority Data
Sep. 30, 2010 (CN) .......................... 2010 1 0298147

(51) Int. Cl.
*H04B 1/16* (2006.01)
*H04M 1/00* (2006.01)
*H04B 1/38* (2006.01)

(52) U.S. Cl.
USPC ....................................... 455/574; 455/343.4

(58) Field of Classification Search
USPC .......... 455/425, 73, 550.1, 574, 127.5, 343.1, 455/343.4
See application file for complete search history.

(56) References Cited

U.S. PATENT DOCUMENTS

| 8,041,968 | B2 * | 10/2011 | Tupman | 713/320 |
| 8,437,810 | B2 * | 5/2013 | Hussain | 455/574 |
| 2007/0139363 | A1 * | 6/2007 | Huang | 345/156 |
| 2007/0245008 | A1 * | 10/2007 | Matsui et al. | 709/223 |
| 2008/0309490 | A1 * | 12/2008 | Honkanen et al. | 340/572.1 |
| 2010/0048239 | A1 * | 2/2010 | Kelleher et al. | 455/552.1 |

FOREIGN PATENT DOCUMENTS

| CN | 1400544 A | 3/2003 |
| CN | 1400544 A | 3/2003 |
| CN | 1913354 | 2/2007 |
| CN | 1913354 A | 2/2007 |
| CN | 101815133 A | 8/2010 |
| CN | 101815133 | 8/2011 |

* cited by examiner

*Primary Examiner* — Andrew Wendell
(74) *Attorney, Agent, or Firm* — Novak Druce Connolly Bove + Quigg LLP

(57) ABSTRACT

An electronic device for accessing wireless network includes a radio frequency (RF) module, a power supply management unit, a CPU and a data transmission interface. The RF module receives electromagnetic wave signal from networks and transmits electromagnetic wave signals to the networks. The data transmission interface transmits the electromagnetic wave signals from the RF module to the CPU, and transmits data and commands between the RF module and the CPU. When the electronic device does not communicate with a remote server on the networks during a predetermined time period, the CPU suspends the data transmission interface. A related method of saving resource is also provided.

10 Claims, 2 Drawing Sheets

ELECTRONIC DEVICE FOR ACCESSING WIRELESS NETWORK AND METHOD FOR SAVING RESOURCES FOR THE DEVICE

BACKGROUND

1. Technical Field

The present disclosure relates to wireless communication technology, and particularly, to an electronic device for accessing wireless network and method for saving resources.

2. Description of the Related Art

Normally, for an electronic device with wireless network access function, a radio frequency (RF) module for accessing wireless network is employed in the electronic device, to receive and demodulate electromagnetic wave signals, and then the electromagnetic wave signals that have been demodulated are transmitted to CPU via a data transmission interface supported by a data transport protocol (TCP). However, even when there is no electromagnetic wave signals received, the electronic device still keeps the data transmission interface running. That is, the data transmission interface is always ready to transmit the electromagnetic wave signals. Running the data transmission interface occupies memory space of the electronic device and reduces processing efficiency of the electronic device.

Therefore, there is room for improvement within the art.

BRIEF DESCRIPTION OF THE DRAWINGS

The components in the drawings are not necessarily drawn to scale, the emphasis instead being placed upon clearly illustrating the principles of an electronic device for accessing wireless network and method for saving resource. Moreover, in the drawings, like reference numerals designate corresponding parts throughout the several views.

DETAILED DESCRIPTION

Figure 1:
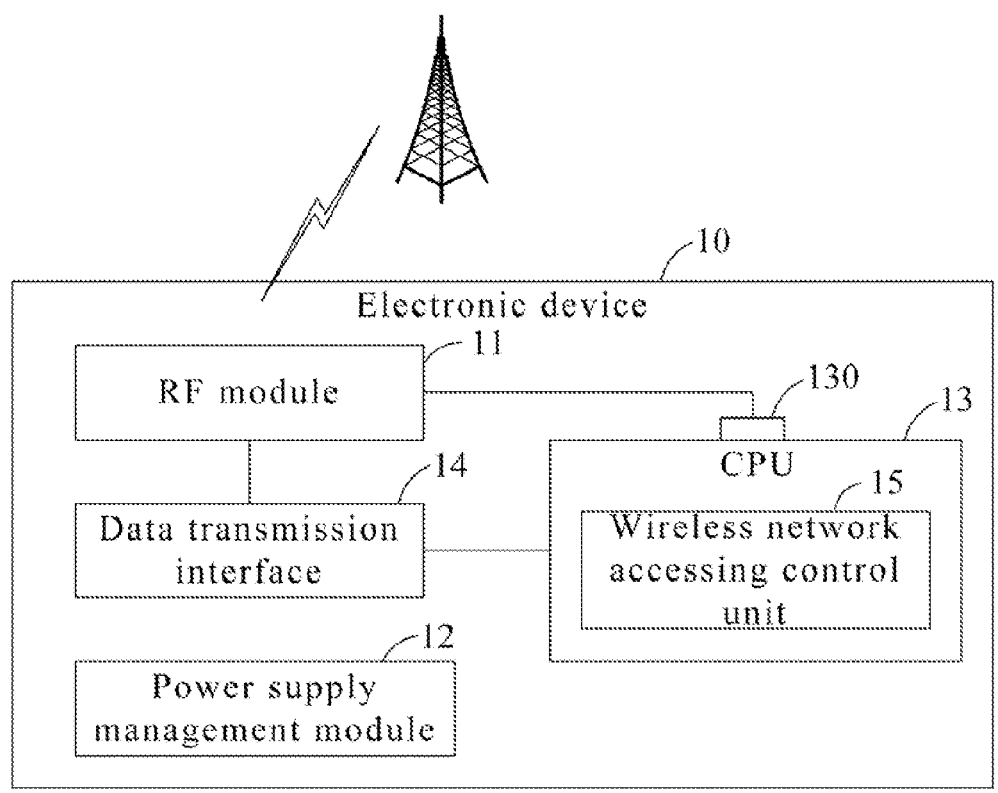
FIG. 1 is a block diagram of an electronic device for accessing wireless network in accordance with an exemplary embodiment.

Referring to FIG. 1, is a block diagram of an electronic device for accessing wireless network in accordance with an exemplary embodiment. The electronic device 10 can be, for example, a personal digital assistant (PDA), or an e-book. The electronic device 10 for accessing wireless network includes a radio frequency (RF) module 11, a power supply management unit 12, a CPU 13 and a data transmission interface 14 used for supporting the communication between the RF module 11 and the CPU 13. In the exemplary embodiment, the electronic device 10 provides two reading modes. In this embodiment, an on-line reading mode and a local reading mode. The local reading mode refers to display contents stored in a local memory of the electronic device 10, and the on-line reading mode refers to display contents stored in a remote server.

The RF module 11 is configured for receiving and demodulating electromagnetic wave signals from networks. The electronic device 10 further includes a wireless network accessing control unit 15, configured for the electronic device 10 to access an particular remote server (not shown) via the RF module 11, thus to obtain contents requested by users. In the exemplary embodiment, the RF module 11 is also connected to an enabled port 130 of the CPU 13 via a wire. The RF module signals the CPU via the enabled port 130.

The data transmission interface 14 is configured for transmitting the electromagnetic wave signals demodulated by the RF module 11 to the CPU 13, and further configured for transmitting data and commands between the RF module 11 and the CPU 13. The electromagnetic wave signals carrying contents requested by the users from the remote server, the contents are displayed on the electronic device 10 to the users. In the exemplary embodiment, the data transmission interface 14 is supported by a USB transport protocol and is connected between the RF module 11 and the CPU 13.

When the electronic device 10 does not communicate with the remote server during a predetermined time period T, the CPU 13 suspends the data transmission interface 14, namely, the data transmission interface 14 enters stand by mode. When the electronic device 10 requests for uploading content to or downloading contents from the remote server during the predetermined time period T, the CPU 13 communicates with the remote server via the data transmission interface 14 and the RF module 11. In addition, the RF module 11 modulates the requests and contents from the CPU 13 and then transmits the requests and the contents to the remote server, and further demodulates contents transmitted from the wireless network and transmits the contents to the CPU 13.

When the data transmission interface 14 is suspended, the CPU 13 is further configured for determining whether the electronic device 10 is in the local reading mode. If yes, the CPU 13 continually suspends the data transmission interface 14. If no, the CPU 13 controls the electronic device 10 as a whole except the RF module 11 enters a sleep mode to further reduce power consumption. At the same time, the RF module 11 enters a monitor mode to receive potential electromagnetic wave signals transmitted from the remote server to the electronic device 10.

When the electronic device 10 is in the sleep mode, the power supply management unit 12 stops powering the data transmission interface 14 for reducing consumption of the electronic device 10.

When the electronic device 10 is in monitor mode, and the RF module 11 receives electromagnetic wave signals transmitted from the remote server, the RF module 11 transmits a signal to the CPU 13 to activate the electronic device 10, the CPU 13 controls the power supply management unit 11 to power the data transmission interface 14 again. In the exemplary embodiment, the RF module 11 is also connected to an enabled port of the CPU 13. The RF module 11 signals the CPU 13 via the enabled port, when the electromagnetic wave signals are received from the remote server. The CPU 13 controls the power supply management unit 12 to power the data transmission interface 14 again.

Figure 2:
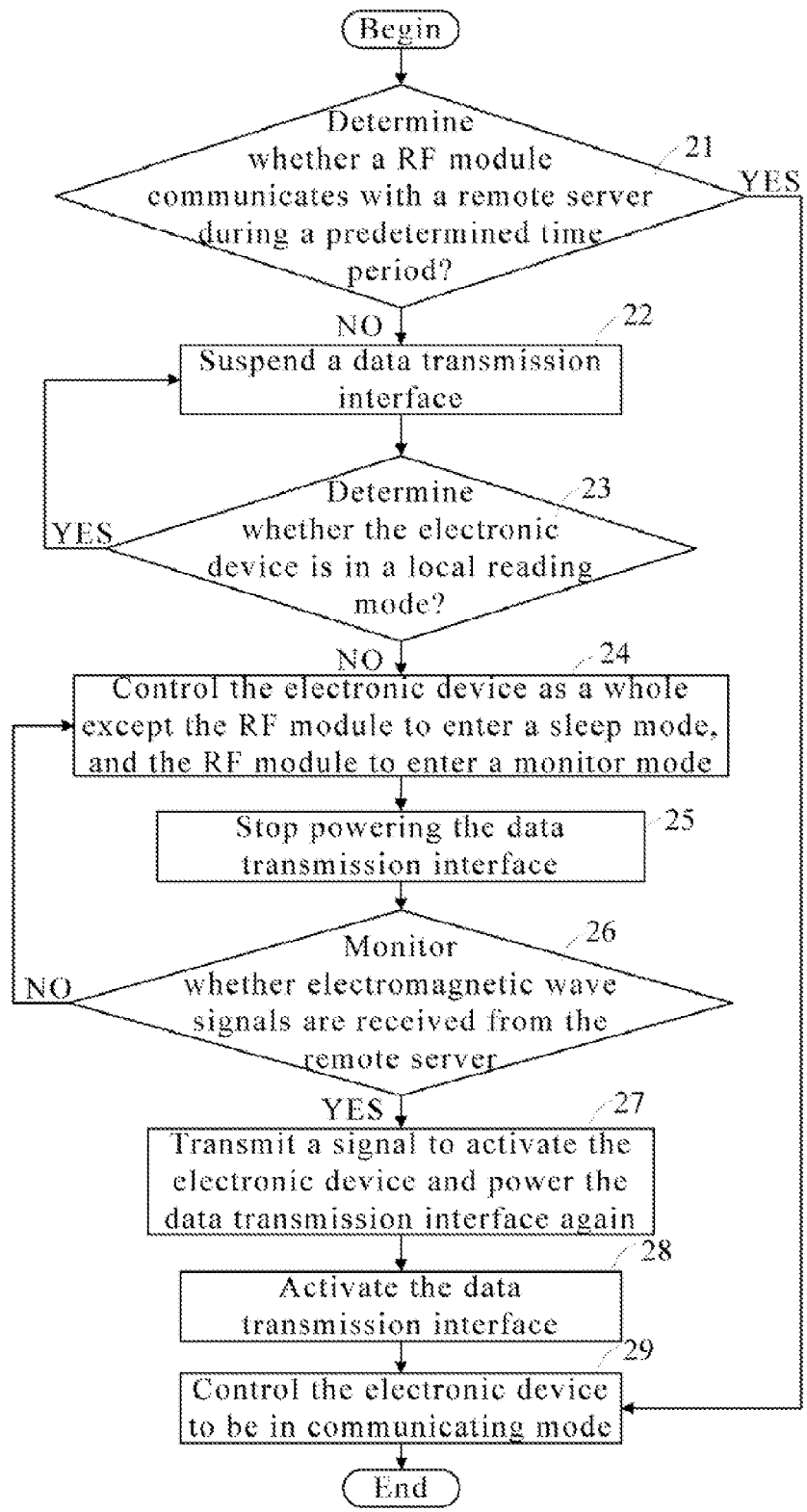
FIG. 2 is a flowchart of a method for an electronic device for saving resources for the electronic device in accordance with an exemplary embodiment.

FIG. 2 is a flowchart of a method for an electronic device capable of saving resources.

In step S21, the CPU 13 determines whether the RF module 11 communicates with the remote server during the predetermined time period T. If yes, the procedure goes to step S28; otherwise, the procedure goes to step S22.

In step S22, the CPU 13 suspends the data transmission interface 14.

In step S23, the CPU 13 determines whether the electronic device 10 is in the local reading mode. If yes, the procedure returns to step S22; otherwise, the procedure goes to step S24.

In step S24, the CPU 13 controls the electronic device 10 as a whole except the RF module 11 to enter a sleep mode, and at the same time the RF module 11 to enters a monitor mode.

In step S25 the CPU 13 controls the power supply management unit 12 to stop powering the data transmission interface 14.

In step S26, the RF module 11 monitors whether electromagnetic wave signals are received from the remote server. If yes, the procedure goes to step S27; otherwise, the procedure returns to step S24.

In step S27, the RF module 11 transmits a signal to the CPU 13 to activate the electronic device 10, the CPU 13 controls the power supply management unit 11 to power the data transmission interface 14 again.

In step S28, the CPU activates the data transmission interface 14.

In step S29, the CPU 13 controls the electronic device 10 to be in communication mode.

It is understood that the pre-transmitted disclosure may be embodied in other forms without departing from the spirit thereof. Thus, the pre-transmitted examples and embodiments are to be considered in all respects as illustrative and not restrictive, and the disclosure is not to be limited to the details given herein.

What is claimed is:

1. An electronic device for accessing wireless network, comprising:
    a radio frequency (RF) module configured for receiving electromagnetic wave signals from networks and transmitting electromagnetic wave signals to the networks;
    a power supply management unit;
    a CPU; and
    a data transmission interface connected between the RF module and the CPU, the data transmission interface configured for transmitting the electromagnetic wave signals from the RF module to the CPU, and further configured for transmitting data and commands between the RF module and the CPU;
    wherein when the electronic device does not communicate with a remote server on the networks during a predetermined time period, the CPU suspends the data transmission interface, and further determines whether the electronic device is in a local reading mode, if the electronic device is not in the local reading mode, the CPU controls the electronic device as a whole except the RF module to enter a sleep mode, and controls the power supply management unit to stop powering the data transmission interface.

2. The electronic device as recited in claim 1, wherein if the electronic device is not in the local reading mode, the CPU controls the RF module to enter a monitor mode to monitor potential electromagnetic wave signals from the remote server.

3. The electronic device as recited in claim 2, wherein the RF module is also connected to an enabled port of the CPU via a wire, the RF module signals the CPU via the enabled port if the electromagnetic wave signals are received from the remote server, and the CPU controls the power supply management unit to power the data transmission interface again.

4. The electronic device as recited in claim 1, wherein the RF module is further connected to an enabled port of the CPU, the RF module signals the CPU via the enabled port, when the electromagnetic wave signals are received from the remote server, and the CPU activates the data transmission interface.

5. The electronic device as recited in claim 1, wherein the data transmission interface is supported by a USB transport protocol and connected between the RF module and the CPU.

6. The electronic device as recited in claim 1, further comprising:
    a wireless network accessing control unit configured for the electronic device to access the remote server via the RF module to obtain contents requested by users.

7. A method for saving resources applied in an electronic device for accessing wireless network, the electronic device comprising a radio frequency (RF) module, a CPU, a data transmission interface connected between the RF module and CPU and a power supply management unit, the method comprising:
    determining whether the RF module communicates with a remote server during a predetermined time period using the CPU;
    suspending the data transmission interface using the CPU, if the RF module does not communicate with the remote server during the predetermined time period;
    determining whether the electronic device is in a local reading mode using the CPU; and
    controlling the electronic device as a whole except the RF module to enter a sleep mode using the CPU, and stopping powering the data transmission interface using the power supply management unit, if the electronic device is not in the local reading mode.

8. The method as recited in claim 7, further comprising:
controlling the RF module to enter a monitor mode to monitor potential electromagnetic wave signals from the remote server using the CPU, if the electronic device is not in the local reading mode.

9. The method as recited in claim 8, further comprising:
monitoring whether electromagnetic wave signals are received from the remote server, using the RF module; and
signaling the CPU using the RF module, and powering the data transmission interface again using the power supply management unit, if electromagnetic wave signals are received from the remote server.

10. The method as recited in claim 9, further comprising:
activating the data transmission interface using the CPU, if the data transmission interface is powered again.

* * * * *